UNITED STATES PATENT OFFICE.

SAMUEL ADAMS, OF CLEVELAND, OHIO.

IMPROVEMENT IN BLACKING FOR LEATHER.

Specification forming part of Letters Patent No. 2,660, dated May 30, 1842.

*To all whom it may concern:*

Be it known that I, SAMUEL ADAMS, of Cleveland, in the county of Cuyahoga and State of Ohio, have invented a new and useful composition of matter for the purpose of blacking leather on the flesh side, composed of materials mostly vegetable; and I do hereby declare that the following is a full and exact description.

The nature of my invention consists in making and preparing a composition of flaxseed, sunflower-seed, brake-tops, oil of hemlock, copperas, soap, and water for the purpose of blacking leather on the flesh side, which composition shall be so combined and prepared as to constitute and compose a blacking for leather on the flesh side much cheaper and at the same time more durable, glossy, and serviceable to the leather than any other kind of blacking now known or used.

To enable others skilled in the art of manufacturing leather to make and use my invention, I will here proceed more particularly to describe its composition and proportions, together with the process of preparing and using it.

To make one gallon of my composition for blacking leather I take one gill of flaxseed, one-half pint of sunflower-seed, and two quarts of brake-tops—that is to say, so much of the tops of that kind of brake having the black or dark colored root as can be pressed with the hand into a two-quart measure, (which brake-tops shall be green when used or shall have been cut when green and cured by drying,) and put them all in a close sack. I place this sack with its contents in a kettle of soft water and boil the same fiercely one hour, keeping the sack all the time covered with water. I then wring out the sack so as to express all the liquor into the kettle. To this liquor or decoction I add one teaspoonful of the oil of hemlock and a piece of copperas of the size of a walnut and boil the whole until the same is reduced in quantity to one pint, and I then let it cool. I then take three quarts of soft water and one quart of old soap and stir these together until they are well mixed. I boil this last mixture moderately and skim off the froth as it rises. I then stir into it while yet boiling one-third of a pound of pure lampblack of the best quality and let it boil five minutes longer moderately. I then add to this last mixture the one pint of liquor or decoction prepared in the manner first aforesaid, stir the whole together, and boil the same moderately one minute longer. When this composition is thus prepared I let it cool, and it is then complete and fit for use.

I prepare the leather for blacking, apply my composition with brushes, and finish the leather in the same manner as is usually done by good mechanics when other kinds of blacking are used.

What I claim to be my invention, and desire to secure by Letters Patent, is—

The use and application of sunflower-seed, flaxseed, brake-tops, and the oil of hemlock, combined with lampblack, soap, copperas, and water, to and for the purpose of blacking leather in a form or composition which shall be prepared agreeable to the foregoing specifications and instructions.

SAMUEL ADAMS.

Witnesses:
JOSEPH ADAMS,
JOHN BALL.